United States Patent
Song

(10) Patent No.: US 8,191,064 B2
(45) Date of Patent: May 29, 2012

(54) METHOD AND DEVICE FOR SCHEDULING TRUE CPU RESOURCES FOR A VIRTUAL MACHINE SYSTEM

(75) Inventor: Wei Song, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 888 days.

(21) Appl. No.: 12/220,626

(22) Filed: Jul. 24, 2008

(65) Prior Publication Data

US 2009/0031304 A1 Jan. 29, 2009

(30) Foreign Application Priority Data

Jul. 25, 2007 (CN) .......................... 2007 1 0119526

(51) Int. Cl.
*G06F 9/455* (2006.01)
*G06F 9/46* (2006.01)
(52) U.S. Cl. ............................................ 718/1; 718/104
(58) Field of Classification Search ........................ None
See application file for complete search history.

(56) References Cited

U.S. PATENT DOCUMENTS

| | | | |
|---|---|---|---|
| 2002/0087611 A1* | 7/2002 | Tanaka et al. | 709/1 |
| 2005/0262504 A1 | 11/2005 | Esfahany et al. | |
| 2006/0047987 A1* | 3/2006 | Prabhakaran et al. | 713/322 |

FOREIGN PATENT DOCUMENTS

JP 844575 A 2/1996

\* cited by examiner

*Primary Examiner* — Camquy Truong
(74) *Attorney, Agent, or Firm* — Kinney & Lange, P.A.

(57) ABSTRACT

A method and a device for scheduling true CPU resources for a virtual machine system are disclosed. In one aspect a virtual machine monitor (VMM) acquires information about loads on virtual CPUs (VCPUs), and the VMM assigns the true CPU resources based on the information about the loads on the VCPUs in such a manner that more true CPU resources are assigned to a VCPU with a higher load. With the method and device according to certain embodiments, it is possible to assign the true CPU resources based on the information about the loads on the VCPUs in such a manner that more true CPU resources are assigned to a VCPU with a higher load. Further, certain embodiments are implemented directly by the VMM irrespective of types of upper-level GOSs, and thus is versatile.

4 Claims, 2 Drawing Sheets

METHOD AND DEVICE FOR SCHEDULING TRUE CPU RESOURCES FOR A VIRTUAL MACHINE SYSTEM

BACKGROUND

1. Field of the Invention

The present invention relates to virtual machine systems, and more particularly, to a method and a device for scheduling true CPU resources for a virtual machine system.

2. Description of Related Technology

As show in FIG. 1, in a virtual machine system, there are several operating systems (OSs) running on a virtual machine monitor (VMM), and each OS comprises one or more virtual CPU (VCPU). Therefore, it may be necessary for the VMM to assign true CPU resources to the VCPUs based on a certain resource scheduling algorithm. The manner in which the true CPU resources are assigned will affect the performance of the virtual machine system.

Now, the scheduling algorithms for virtual machines are mainly categorized into two kinds: a borrowed virtual time (BVT) method and a SEDF method.

According to the BVT method, the VMM assigns averagely all the true CPU resources to the VCPUs in the upper-level OSs based on the current true CPU resources, so that each VCPU occupies the same amount of the true CPU resources.

However, as is well-known, in the environment of the virtual machine, loads on the VCPUs in the respective OSs are different, while the BVT scheduling algorithm makes a VCPU with a large load and a VCPU with a small load obtain almost same true CPU time. Thus, it is possible that the true CPU time assigned to the VCPU with the large load is insufficient while the true CPU time assigned to the VCPU with the small load is redundant. As a result, the CPU resources are wasted, and thus it is impossible to utilize the true CPU resources to a maximum extent.

Further, according to the SEDF method, the VMM "scores" the respective OSs based on requests for the CPU resources from the respective upper-level OSs and the number of current processes, and then assigns more true CPU resources to an OS requesting for more resources.

The SEDF method overcomes the disadvantage of the BVT method, and is able to utilize the true CPU resources more efficiently. However, it may be necessary to provide special programs in guest operation systems (GOSs) to count these resources. For different OSs (e.g. XP, Linux and Vista), it may be necessary to design different programs. Therefore, this method is not versatile.

SUMMARY OF CERTAIN INVENTIVE ASPECTS

One aspect is a method and a device for scheduling true CPU resources for a virtual machine system, which are implemented by a virtual machine monitor (VMM), so as to utilize the true CPU resources to a maximum extent.

Another aspect is a method for scheduling true CPU resources for a virtual machine system, comprising:

wherein a VMM acquires information about loads on virtual CPUs (VCPUs); and wherein the VMM assigns the true CPU resources based on the information about the loads on the VCPUs in such a manner that more true CPU resources are assigned to a VCPU with a higher load.

In the above method, the information about the loads on the VCPUs is determined based on an interrupt response time, and the longer is the interrupt response time, the higher is the load on the corresponding VCPU.

In the above method, the information about the loads on the VCPUs is determined based on the number of interrupt requests to be processed, and the larger is the number of the interrupt requests to be processed, the higher is the load on the corresponding VCPU.

In the above method, the information about the loads is determined based on an interrupt response time and the number of interrupt requests to be processed in combination.

In the above method, in the step B, the total of the true CPU resources assigned to the VCPUs by the VMM is equal to current available true CPU resources.

In the above method, in the step B, a ratio among the amounts of the true CPU resources assigned to the VCPUs by the VMM is identical to that among load indices of the VCPUs.

Further, another aspect is a device for scheduling true CPU resources for a virtual machine system, comprising an information acquiring module and an assigning module provided in a VMM, wherein, the information acquiring module acquires information about loads on VCPUs; and the assigning module assigns the true CPU resources based on the information about the loads on the VCPUs in such a manner that more true CPU resources are assigned to a VCPU with a higher load.

In the above device, the information about the loads is determined based on an interrupt response time and/or the number of interrupt requests to be processed.

In the above device, the assigning module assigns all the true CPU resources to the VCPUs based on the information about the loads on the VCPUs in such a manner that more true CPU resources are assigned to a VCPU with a higher load.

In the above device, the assigning module assigns the true CPU resources based on a ratio among load indices of the VCPUs.

With the method and device according to certain embodiments, it is possible to assign the true CPU resources based on the information about the loads on the VCPUs in such a manner that more true CPU resources are assigned to a VCPU with a higher load. Further, the present invention is implemented directly by the VMM irrespective of types of upper-level GOSs, and thus is versatile.

DETAILED DESCRIPTION OF CERTAIN INVENTIVE EMBODIMENTS

A method and a device for scheduling true CPU resources for a virtual machine system according to certain embodiments are implemented directly by a virtual machine monitor (VMM), wherein the VMM acquires information about loads on respective VCPUs first, and then assigns the true CPU resources to a VCPU with a high load as many as possible based on the information about the loads on the VCPUs. The information about the loads on the VCPUs may be determined by a plurality of parameters. Hereinafter, the method and the device according to certain embodiments are described in detail for different cases.

First Embodiment

In the first embodiment, the information about the loads is determined based on an interrupt response time.

The called interrupt response time refers to a time period from a time when the VMM issues an interrupt to a VCPU to a time when the VMM receives a response announcing that a process for the interrupt is completed.

Generally, the longer is the interrupt response time, the higher is the load on the corresponding VCPU.

Figure 1:
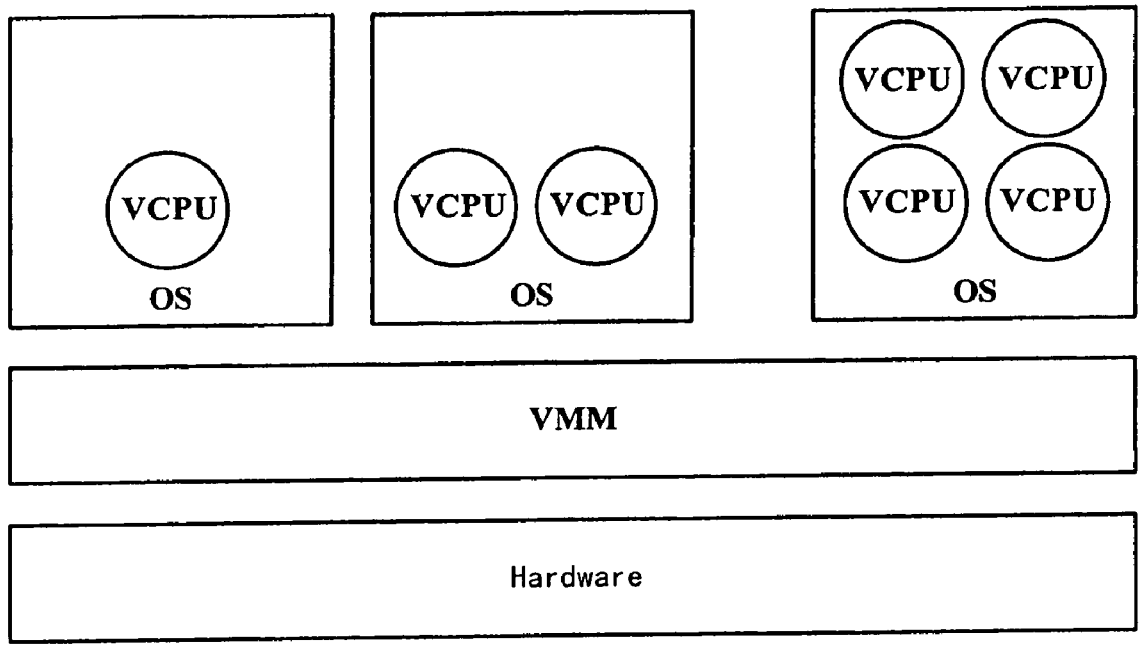
FIG. 1 is a schematic view showing a simplified structure of a virtual machine system.
Figure 2:
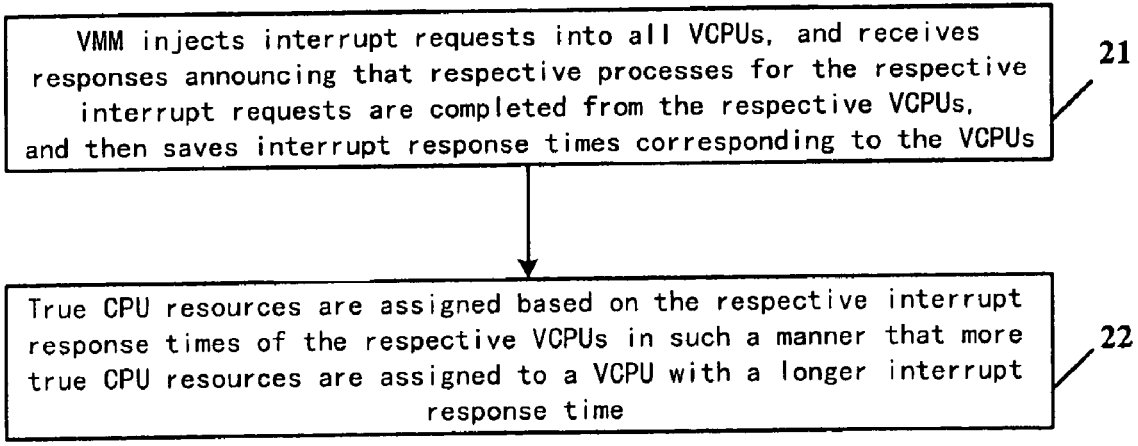
FIG. 2 is a schematic flowchart showing a method according to a first embodiment of the present invention.

As shown in FIG. 2, a method according to the first embodiment of the present invention comprises:

a step 21 of acquiring interrupt response times, wherein the VMM injects interrupt requests into all the VCPUs, and receives responses announcing that respective processes for the respective interrupt requests are completed from the respective VCPUs, and then saves the interrupt response times corresponding to the VCPUs; and a step 22 of assigning the true CPU resources, wherein the true CPU resources are assigned based on the respective interrupt response times of the respective VCPUs in such a manner that more true CPU resources are assigned to a VCPU with a longer interrupt response time.

In the step 21, it interrupts may be injected into the VCPUs, wherein the interrupts may be:

a timer interrupt, such as RTC, PIT and HPET and the like;
a network card interrupt; or
a sound card interrupt or the like.

In the step 22, true CPU resources may be assigned based on the respective interrupt response times of the respective VCPUs in such a manner that more true CPU resources are assigned to a VCPU with a longer interrupt response time. Next, how to assign the resources is explained with reference to a practical example.

A First Manner in which True CPU Resources are Assigned

It is assumed that there are 200 time slots in the true CPU resources, and the virtual machine system comprises 3 VCPUs, VCPU1, VCPU2 and VCPU3 with respective interrupt response times of 5, 3 and 2.

In the step 22, 80 time slots, 60 time slots and 40 time slots may be assigned to VCPU1, VCPU2 and VCPU3 respectively.

In the first manner in which the true CPU resources are assigned, it suffices that the following two conditions are satisfied:

Condition 1: the total of the true CPU resources assigned to the VCPUs is smaller than the current available true CPU resources; and Condition 2: more true CPU resources are assigned to a VCPU with a longer interrupt response time.

However, according to the above assigning scheme, the following situation may occur. For example, if the true CPU resources assigned to VCPU1, VCPU2 and VCPU3 are 50 time slots, 40 time slots and 30 time slots respectively, then the assigned true CPU resources are 120 time slots in total, with a large amount of the true CPU resources (80 time slots) remaining. Therefore, the true CPU resources are not efficiently utilized.

In view of the above, in the first embodiment of the present invention, condition 1 is further modified into that: the total of the true CPU resources assigned to the VCPUs is equal to the current available true CPU resources.

Thus, it is possible to utilize the true CPU resources to a maximum extent while ensuring that a VCPU with a higher load has more true CPU resources assigned thereto.

A Second Manner in which True CPU Resources are Assigned

It is assumed that there are 200 time slots in the true CPU resources, and the virtual machine system comprises 3 VCPUs, VCPU1, VCPU2 and VCPU3 with respective interrupt response times of 5, 3 and 2.

According to the second manner in which the true CPU resources are assigned, a ratio among the amounts of the true CPU resources assigned to the respective VCPUs is identical to that among the interrupt response times of the respective VCPUs. Further, certainly, the total of the true CPU resources assigned to the VCPUs should be smaller than the current available true CPU resources.

According to the second assigning scheme as described above, the true CPU resources assigned to VCPU1, VCPU2 and VCPU3 may be respectively:

50 time slots, 30 time slots and 20 time slots; or
60 time slots, 36 time slots and 24 time slots; or
75 time slots, 45 time slots and 30 time slots; or
100 time slots, 60 time slots and 40 time slots.

As can be seen, if the resources are assigned in the above manner, there may also be the problem that the true CPU resources are utilized to a low extent. For example, in the above situations, there are 100 time slots, 80 time slots, and 50 time slots remaining respectively.

In view of the above, a more suitable assigning scheme is to keep the total of the true CPU resources assigned to the VCPUs equal to the current available true CPU resources while ensuring that the ratio among the amounts of the true CPU resources assigned to the respective VCPUs is identical to that among load indices of the respective VCPUs, here, which load indices are interrupt response times or values obtained after the interrupt response times are normalized in temporal. That is, the true CPU resources assigned to VCPU1, VCPU2 and VCPU3 finally are 100 time slots, 60 time slots and 40 time slots respectively. Thus, both the loads on the respective VCPU and the maximum utilization of the true CPU resources are taken into account.

Second Embodiment

In the second embodiment of the present invention, the information about the loads is determined based on the number of interrupt requests to be processed in a VCPU.

Generally, the larger is the number of the interrupt requests to be processed, the higher is the load on the corresponding VCPU.

Figure 3:
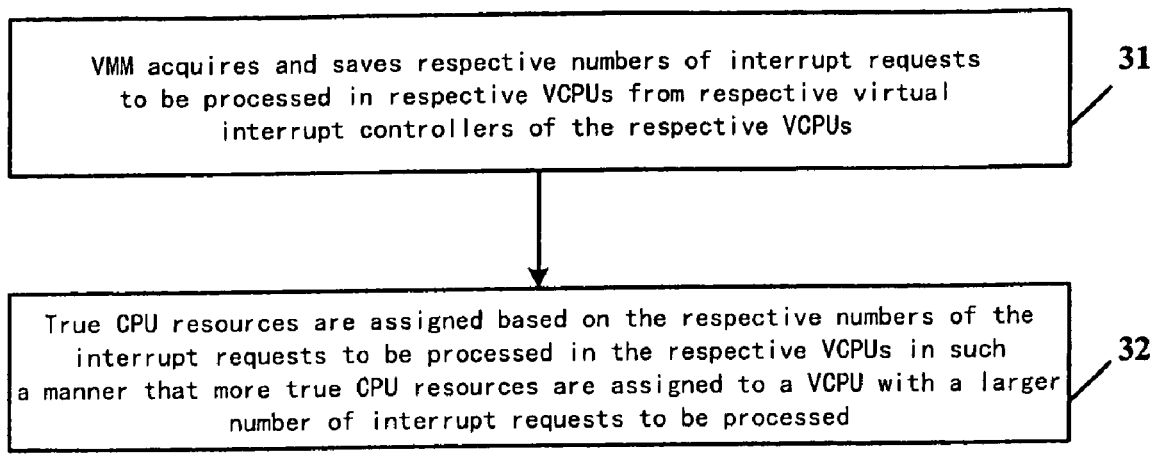
FIG. 3 is a schematic flowchart showing a method according to a second embodiment of the present invention.

As shown in FIG. 3, a method according to the second embodiment of the present invention comprises:

a step 31 of acquiring the numbers of the interrupt requests to be processed, wherein the VMM acquires and saves the respective numbers of the interrupt requests to be processed in the respective VCPUs from respective virtual interrupt controllers of the respective VCPUs; and a step 32 of assigning the true CPU resources, wherein the true CPU resources are assigned based on the respective numbers of the interrupt requests to be processed in the respective VCPUs in such a manner that more true CPU resources are assigned to a VCPU with a larger number of interrupt requests to be processed.

In the step 32, true CPU resources may be assigned based on the respective numbers of the interrupt requests to be processed in the respective VCPUs in such a manner that more true CPU resources are assigned to a VCPU with a larger number of interrupt requests to be processed. Next, how to assign the resources is explained with reference to a practical example.

A First Manner in which True CPU Resources are Assigned

It is assumed that there are 200 time slots in the true CPU resources, and the virtual machine system comprises 3 VCPUs, VCPU1, VCPU2 and VCPU3 with respective numbers of the interrupt requests to be processed of 5, 3 and 2.

In the first manner in which the true CPU resources are assigned, it suffices that the following two conditions are satisfied:

Condition 1: the total of the true CPU resources assigned to the VCPUs is equal to the current available true CPU resources; and Condition 2: more true CPU resources are assigned to a VCPU with a larger number of interrupt requests to be processed.

According to the above assigning scheme, the true CPU resources assigned to VCPU1, VCPU2 and VCPU3 may be respectively:

120 time slots, 60 time slots and 20 time slots; or 140 time slots, 50 time slots and 10 time slots;

Thus, it is possible to utilize the true CPU resources to a maximum extent while ensuring that a VCPU with a higher load has more true CPU resources assigned thereto.

A Second Manner in which True CPU Resources are Assigned

It is assumed that there are 200 time slots in the true CPU resources, and the virtual machine system comprises 3 VCPUs, VCPU1, VCPU2 and VCPU3 with respective numbers of the interrupt requests to be processed of 5, 3 and 2.

According to the second manner in which the true CPU resources are assigned, a ratio among the amounts of the true CPU resources assigned to the respective VCPUs is identical to that among the load indices of the respective VCPUs, here, which load indices are numbers of the interrupt requests to be processed or values obtained after the numbers are normalized. At the same time, the total of the true CPU resources assigned to the VCPUs is equal to the current available true CPU resources.

According to the second assigning scheme described above, the true CPU resources assigned to VCPU1, VCPU2 and VCPU3 are 100 time slots, 60 time slots and 40 time slots respectively, taking into account both the loads on the respective VCPU (the ratio among the true CPU resources assigned to VCPU1, VCPU2 and VCPU3 is 5:3:2) and the maximum utilization of the true CPU resources (all the true CPU resources of 200 time slots have been assigned).

Third Embodiment

In the third embodiment of the present invention, the information about the loads is determined based on both an interrupt response time and the number of interrupt requests to be processed in a VCPU.

Generally, the larger is the number of the interrupt requests to be processed, the higher is the load on the corresponding VCPU; also, the longer is the interrupt response time, the higher is the load on the corresponding VCPU.

Figure 4:
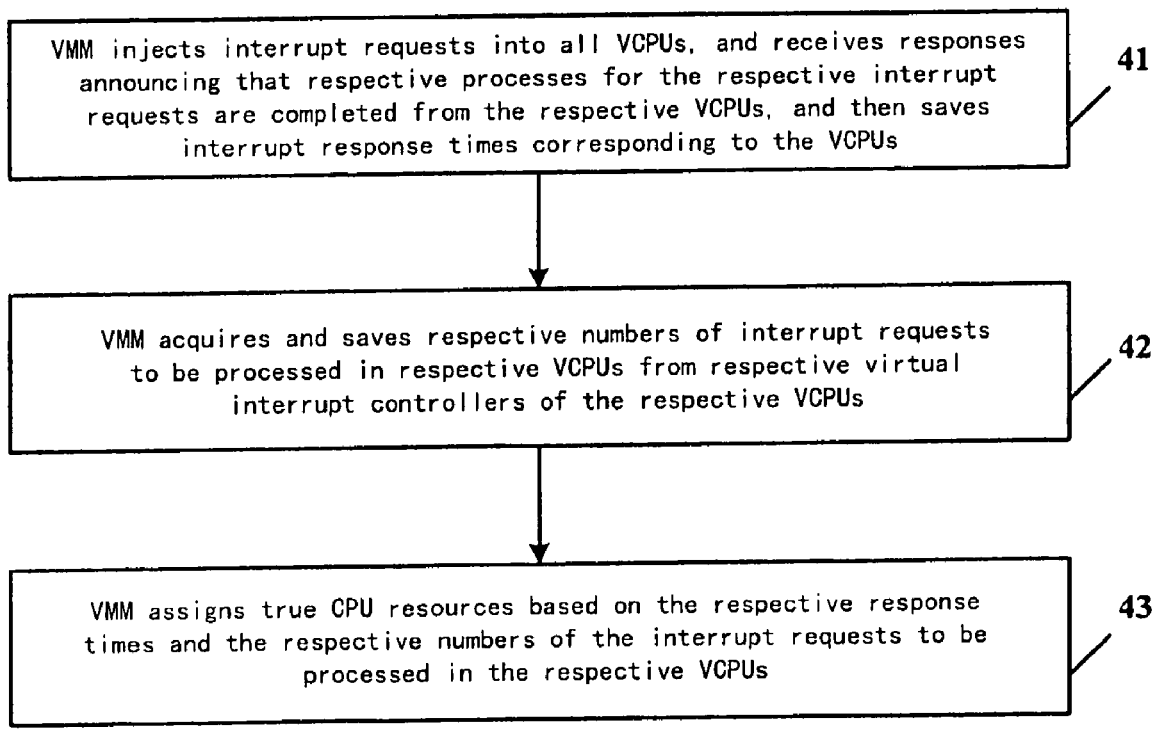
FIG. 4 is a schematic flowchart showing a method according to a third embodiment of the present invention.

As shown in FIG. 4, a method according to the third embodiment of the present invention comprises:

a step 41, wherein the VMM injects interrupt requests into all the VCPUs, and receives responses announcing that respective processes for the respective interrupt requests are completed from the respective VCPUs, and then saves the interrupt response times corresponding to the VCPUs;

a step 42, wherein the VMM acquires and saves the respective numbers of the interrupt requests to be processed in the respective VCPUs from the respective virtual interrupt controllers of the respective VCPUs; and a step 43, wherein the true CPU resources are assigned based on the respective response times and the respective numbers of the interrupt requests to be processed in the respective VCPUs in such a manner that more true CPU resources are assigned to a VCPU with a longer interrupt response time and more true CPU resources are assigned to a VCPU with a larger number of interrupt requests to be processed.

In the step 43, the true CPU resources are assigned based on two factors: the interrupt response time and the number of the interrupt requests to be processed.

Therefore, it is easier to be implemented if these two factors are combined into one factor to be considered.

Next, how to combine the interrupt response time and the number of the interrupt requests to be processed is explained by way of example.

It is assumed that there are 200 time slots in the true CPU resources, and the virtual machine system comprises 3 VCPUs, VCPU1, VCPU2 and VCPU3 with respective numbers of the interrupt requests to be processed of 5, 3 and 2 and with respective interrupt response times of 2, 6 and 4.

The numbers of the interrupt requests to be processed are normalized, that is, divided by 5, resulting in 1, 3/5 and 2/5.

The interrupt response times are normalized, that is, divided by 6, resulting in 1/3, 1 and 2/3.

Then, the corresponding values are added to obtain the load indices, resulting in 3/4, 8/5 and 16/15.

Finally, the true CPU resources are assigned based on the load indices (3/4, 8/5 and 16/15 respectively for VCPU1, VCPU2 and VCPU3). Since 3/4<16/15<8/5, the true CPU resources assigned to VCPU2 are more than those assigned to VCPU3, which in turn are more than those assigned to VCPU1.

Further, in the step 43, it is ensured that the total of the true CPU resources assigned to the VCPUs is equal to the current available true CPU resources and thus it is possible to utilize the true CPU resources to a maximum extent.

Further, the ratio among the amounts of the true CPU resources assigned to VCPU1, VCPU2 and VCPU3 respectively is 3/4:8/5:16/15, and thus the loads on the respective VCPUs are taken into account.

Next, another combining method is described below.

The numbers of the interrupt requests to be processed are normalized, that is, divided by 5, resulting in 1, 3/5 and 2/5, which then are multiplied by a weight of 2, resulting in 2, 6/5 and 4/5.

The interrupt response times are normalized, that is, divided by 6, resulting in 1/3, 1 and 2/3, which then are multiplied by a weight of 1, resulting in 1/3, 2 and 2/3.

Then, the corresponding values are added to obtain the load indices, resulting in 7/3, 16/5 and 22/15.

Finally, the true CPU resources are assigned based on the load indices (7/3, 16/5 and 22/15 respectively for VCPU1, VCPU2 and VCPU3). Therefore, the true CPU resources assigned to VCPU2 are more than those assigned to VCPU1, which in turn are more than those assigned to VCPU3.

Further, taking a maximum utilization of the true CPU resources into account, the total of the true CPU resources assigned to the VCPUs is equal to the current available true CPU resources.

Further, taking the loads on the respective VCPUs into account, the ratio among the amounts of the true CPU resources assigned to VCPU1, VCPU2 and VCPU3 respectively is 7/3:16/5:22/15.

A device for scheduling true CPU resources for a virtual machine system according to the present invention comprises:

an information acquiring module, for acquiring information about loads characterizing the loads on respective VCPUs from the VCPUs;

an assigning module, for assigning the true CPU resources based on the information about the loads in such a manner that more true CPU resources are assigned to a VCPU with a higher load.

The information about the loads may be determined based on the number of interrupt requests to be processed or an interrupt response time.

When the information about the loads is determined based on the number of the interrupt requests to be processed, more true CPU resources are assigned to a VCPU with a larger number of interrupt requests to be processed.

When the information about the loads is determined based on the interrupt response time, more true CPU resources are assigned to a VCPU with a longer interrupt response time.

Those described above are only preferred embodiments of the present invention. It is to be noted that it is possible for those skilled in the art to make some improvements and modifications without departing from the principle of the present invention, which improvements and modifications should fall into the scope of the present invention.

What is claimed is:

1. A method for scheduling true CPU resources for a virtual machine system, comprising:

step A: a virtual machine monitor (VMM) acquiring information about loads on virtual CPUs (VCPUs); and step B: the VMM assigning the true CPU resources based on the information about the loads on the VCPUs in such a manner that more true CPU resources are assigned to a VCPU with a higher load;

wherein the information about the loads on the VCPUs is determined based on an interrupt response time and the number of interrupt requests to be processed in combination, and the longer the interrupt response time and the larger the number of interrupt requests to be processed, the higher the load is on the corresponding VCPU, and wherein in step B, the total of the true CPU resources assigned to the VCPUs by the VMM is equal to currently available true CPU resources.

2. The method according to claim 1, wherein in step B, a ratio among the amounts of the true CPU resources assigned to the VCPUs by the VMM is identical to that among load indices of the VCPUs.

3. A computer, comprising:

a central processing unit (CPU); and a memory having computer usable program code stored thereon;

wherein, when the code is executed on the CPU, the computer is configured to:

acquire information about loads on virtual CPUs (VCPUs); and assign true CPU resources based on the information about the loads on the VCPUs in such a manner that more true CPU resources are assigned to a VCPU with a higher load;

wherein the information about the loads is determined based on an interrupt response time and the number of interrupt requests to be processed in combination, and the longer the interrupt response time and the larger the number of interrupt requests to be processed, the higher the load is on the corresponding VCPU, and wherein the total of the true CPU resources assigned to the VCPUs is equal to the currently available true CPU resources.

4. The device according to claim 1, wherein the computer is further configured to assign the true CPU resources based on a ratio among load indices of the VCPUs.

* * * * *